July 10, 1951 V. E. GLEASMAN 2,559,916
DIFFERENTIAL
Filed Aug. 29, 1949 2 Sheets-Sheet 1

INVENTOR.
Vernon E. Gleasman
BY
Alexander D. Powell
ATTORNEYS

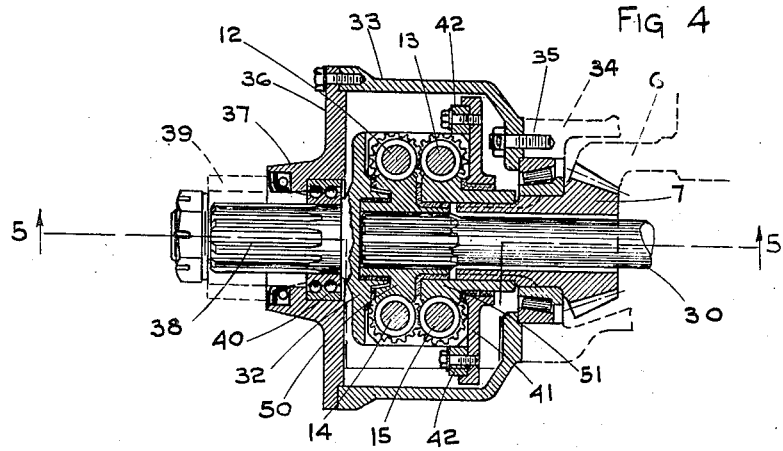
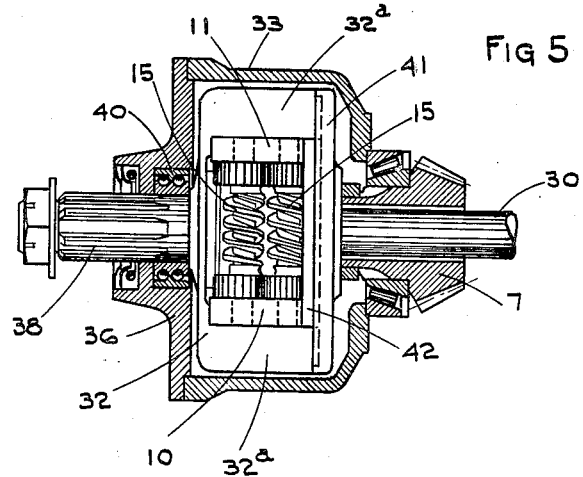

Patented July 10, 1951

2,559,916

UNITED STATES PATENT OFFICE 2,559,916

DIFFERENTIAL

Vernon E. Gleasman, Elmira, N. Y.

Application August 29, 1949, Serial No. 112,945

9 Claims. (Cl. 74—715)

This invention is a novel improvement in differentials for heavy duty trucks, or the like, embodying the worm gear principle; and the principal object thereof is to provide a simple, novel and efficient differential embodying a replaceable cartridge unit in the gear carrier in which the worm or like gears are incorporated, so arranged as to provide a very compact and rugged unit which may be readily assembled and disassembled, and which will permit utilizing a ring gear and ring carrier of ordinary size, the differential being particularly characterized by simplicity of machining of the various interfitting parts.

Another object is to provide a differential of the above type which may be used between sets of axles as a positive equalizer.

A further object of the invention is to provide an equalizer unit which may be utilized with tandem drive axles, the same embodying the cartridge unit.

Other minor objects of the invention will be hereinafter set forth.

I will explain the invention with reference to the accompanying drawings, which illustrate one practical embodiment thereof, to enable others familiar with the art to adopt and use the same; and will summarize in the claims the novel features of construction and novel combinations of parts, for which protection is desired.

In said drawings:

Fig. 4 is a longitudinal section through an equalizer unit utilized where tandem drive axles are used.

Fig. 5 is a longitudinal section taken on line 5—5, Fig. 4.

Figure 1:
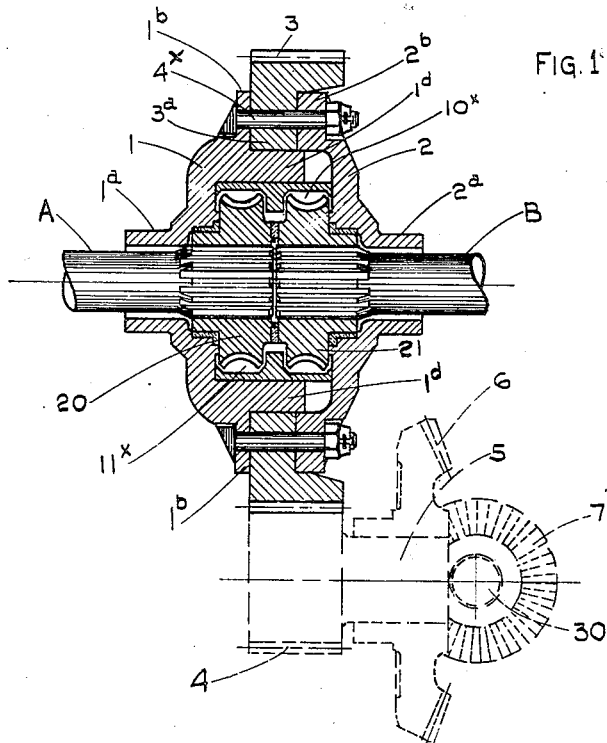
Figure 1 is a longitudinal sectional view taken on line 1—1, Fig. 3, showing the differential constructed according to my invention, and indicating in dotted lines a conventional drive.
Figure 2:
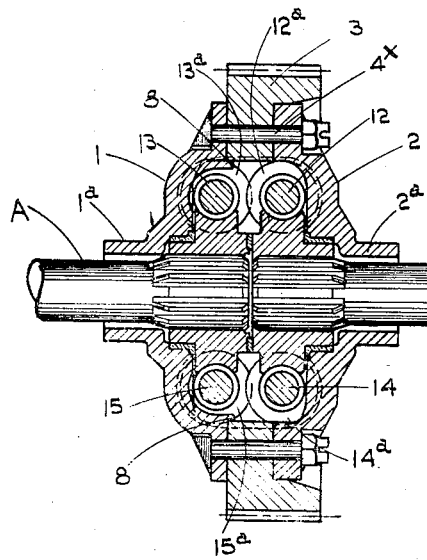
Fig. 2 is a vertical section through the differential on the line 2—2, Fig. 3.
Figure 3:
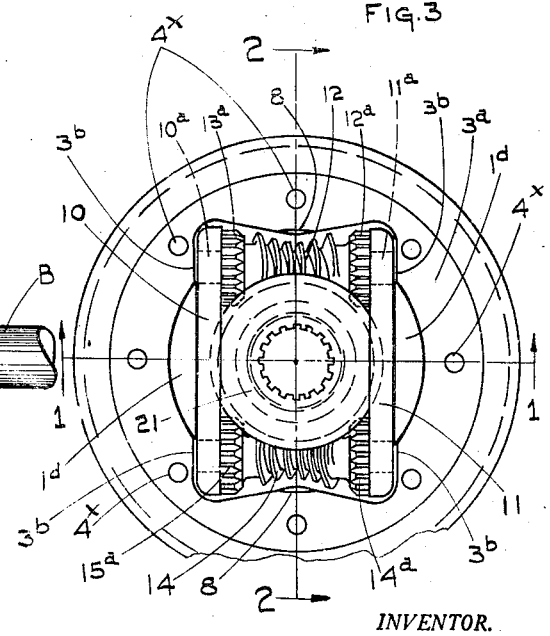
Fig. 3 is an end view of the differential, with one cover plate removed.

As shown in Figs. 1 to 3, the differential comprises a pair of gear carriers 1 and 2 which are disposed opposite each other, each having tubular hub extensions 1a and 2a which receive the ends of the axle sections A and B, the latter being disposed in axial alignment in the usual manner, the extensions 1a—2a serving as bearing supports for the entire assembly in the usual manner.

Gear carrier 1 is provided with an annular flange 1b which is disposed opposite an annular portion 2b of the carrier 2, an annular spur gear 3 provided with an internal annular flange 3a being interposed between the flange 1b and the annular portion 2b and being secured thereto by bolts 4x or the like so as to bind the carriers 1 and 2 and the spur gear 3 together as a concentric unit.

The gear carriers 1 and 2 are preferably driven in the conventional manner by a gear 4 (Fig. 1) on a shaft 5 carrying a bevel gear 6 which meshes with a bevel drive pinion 7, the drive for the spur gear being purely conventional and forming no part of my present invention.

As clearly shown in Fig. 3, the internal annular flange 3a is provided with opposed aligned pairs of cuts 3b at each side of the axial sections A and B, the cuts at each side being in alignment with segmental lugs 1d formed on the gear carrier 1, the inner faces of which are in alignment with the cuts 3b so as to form therebetween a chamber having parallel sides to receive the cartridge unit hereinafter described.

Between the parallel sides, above referred to, are piloting lugs 8 (Figs. 2 and 3) which center the spur gear 3 in the opposite plane from the lugs 1d, the arcuate portions of the lugs 8 being formed on the same radius as the arcuate portions of the lugs 1d. The lugs 1d project into the hollow of the other carrier 2 and add to the support thereof. By reason of the lugs 1d and 8, the members of the housing 1, 2 and 3 are maintained in concentric relation.

The cartridge unit, as shown more particularly in Fig. 3, comprises parallel side plates 10 and 11 having pairs of bores 10a and 11a in their ends adapted to receive the journals of worms 12, 13, 14 and 15, respectively, which worms are provided with gears 12a, 13a, 14a, and 15a (Fig. 3) on their respective ends, so that the worms 12 and 13 may be held in a substantially nonrotatable position, and the worms 14 and 15 are similarly held.

Within the chamber formed between the carriers 1 and 2 is a worm wheel 20 which is keyed on the axle section A, the axle section B carrying a worm wheel 21, the wheels 20—21 rotating in recesses 10x and 11x respectively, provided in the side plates 10 and 11, so as to permit the use of worm wheels 20 and 21 of maximum diameter without weakening the side plates 10 and 11. The worm wheel 20 is in constant mesh with the worms 13 and 15, while the worm wheel 21 is in constant mesh with the worms 12 and 14.

The helical angle of the worms is such that it prevents one wheel or the other from spinning, due to loss of traction, while having the ability to follow when the road surface controls the difference in axle speed, such as in rounding a curve or any irregular terrain.

By the above construction, the provision of the cut-out portions 3b in the web 3a of the gear 3 provides a very solid construction in that the corners of the cartridge unit directly bear against the cut-out portions 3b so that, if desired, the ring gear may directly drive the cartridge unit, thus relieving the stress from the bolts 4x. While I have shown the ring gear mounted between the gear carriers 1 and 2 it is obvious that it may be mounted on either one of the carriers 1 and 2.

When utilizing tandem axles in which both axles are driven, the shaft 30 (Figs. 4 and 5) passes through a bore in pinion gear 7 (Fig. 1), the shaft 30 passing on to the rear tandem axle in the conventional manner.

In this modification (Figs. 4 and 5) the spider gear carrier 32 is mounted in a housing 33 which is fixedly secured to the conventional differential 34 in any desired manner, such as by screws 35 or the like. The outer end of the housing is closed by plate 36 having a tubular extension 37 through which passes a stub shaft 38 to receive a universal joint 39, in the conventional manner, the shaft 38 being preferably journaled in anti-friction bearings 40, and shaft 38 being in axial alignment with the shaft 30. Stub shaft 38 directly carries within the housing 33 the spider gear carrier 32 for rotation therein, and the spider gear carrier 32 is provided with diametrically opposed segmental lugs 32a (Fig. 5) which support the worm spider gear cartridge unit hereinafter described, said lugs 32a forming a substantially rectangular chamber receiving the cartridge unit, which cartridge unit is maintained between the lugs 32a by a plate 41, provided with segmental keys 42, which pilots the cartridge unit within the gear carrier 32 in the direction opposite from the lugs 32a.

In this modification, the cartridge unit is similar to that described in the previous modification, the same comprising side plates 10 and 11 which have bores receiving the ends of the worm gears 12, 13, 14 and 15 which are substantially identical with those shown in the previous modification, the gears 12 and 14 meshing with a worm wheel 50 mounted on the rear axle tandem shaft 30, while the worms 13 and 15 constantly mesh with a worm wheel 51 which is keyed or otherwise secured to the pinion 7 of the forward tandem axle.

By the above construction, the worm wheel 51 is constantly rotated by the prime mover of the vehicle, while the worm wheel 50 is carried by the shaft 30 and is also rotated continuously by the prime mover or shaft 38.

The helical angle of the worms is such that it prevents one tandem axle or the other from spinning, due to loss of traction, while having the ability to follow when the road surface controls difference in speed of the pinion 7 and shaft 30 in accordance with the surface of the terrain on which the vehicle is traveling.

I do not limit my invention to the exact forms shown in the drawings, for obviously changes may be made therein within the scope of the claims.

I claim:

1. A differential for connecting aligned axle sections or the like, comprising a gear carrier; aligned axle sections entering said gear carrier; means for rotating said carrier; spaced parallel worm wheels within the carrier mounted on the respective axle sections; and a removable cartridge unit within the carrier rotatable therewith, said unit comprising a pair of substantially parallel plates; said gear carrier comprising housing sections having recesses in their opposed faces, each recess having aligned cut-out portions receiving the ends of the substantially parallel plates of the cartridge unit, and one section of the housing having segmental lugs aligned with the cut-out portions abutting the substantially parallel plates intermediate their ends, the cut-outs and lugs forming a chamber having substantially parallel sides to receive the cartridge unit therein.

2. In a differential as set forth in claim 1, means for supporting the ends of the segmental lugs to prevent separation thereof.

3. A differential for connecting aligned axle sections or the like, comprising a gear carrier; aligned axle sections entering said gear carrier; means for rotating said carrier; spaced parallel worm wheels within the carrier mounted on the respective axle sections; and a removable cartridge unit within the carrier rotatable therewith, said unit comprising a pair of substantially parallel plates; said gear carrier comprising housing sections having recesses in their opposed faces, each recess having aligned cut-out portions receiving the ends of the substantially parallel plates of the cartridge unit, and one section of the housing having segmental lugs aligned with the cut-out portions abutting the substantially parallel plates intermediate their ends, the cut-outs and lugs forming a chamber having substantially parallel sides to receive the cartridge unit therein, and said sections having piloting lugs disposed approximately 90° from the segmental lugs for maintaining the housing sections in concentric relation.

4. A differential for connecting aligned axle sections or the like, comprising a gear carrier; aligned axle sections entering said gear carrier; means for rotating said carrier; spaced parallel worm wheels within the carrier mounted on the respective axle sections; and a removable cartridge unit within the carrier rotatable therewith, said unit comprising a pair of substantially parallel plates; said gear carrier having diametrically opposed lugs receiving the substantially parallel plates of the cartridge unit, said lugs forming a substantially rectangular chamber therefor; and a plate secured to the outer ends of the lugs for piloting the cartridge unit therein, said plate having segmental keys engaging the outer faces of the parallel plates.

5. A differential for connecting aligned axle sections or the like, comprising a gear carrier; aligned axle sections entering said gear carrier; means for rotating said carrier; spaced parallel worm wheels within the carrier mounted on the respective axle sections; a removable cartridge unit within the carrier rotatable therewith, said unit comprising a pair of substantially parallel plates, pairs of worms having their ends journaled in the pairs of plates, said worms meshing with the respective worm wheels at diametrically opposite sides thereof, and meshing spur gears connecting the worms, whereby the load on the axle sections will be constantly equalized by the spur gears rotating in opposite directions, the helical angle of the worms preventing either axle section from spinning with respect to the other due to loss of traction; and said means for rotating the carrier comprising a housing forming part of the gear carrier, and a driving gear mounted on the housing.

6. In a differential as set forth in claim 5, said housing being sectional and having opposed recesses in its opposed faces, each recess having aligned cut-out portions receiving the ends of the parallel plates of the cartridge unit, and one section of the housing having segmental lugs aligned with the cut-out portions thereof abutting the parallel plates intermediate their ends, the cut-outs and lugs forming a chamber having parallel sides to receive the cartridge unit therein.

7. In a differential as set forth in claim 5, said housing being sectional and having opposed recesses in its opposed faces, each recess having aligned cut-out portions receiving the ends of the parallel plates of the cartridge unit, and one section of the housing having segmental lugs aligned with the cut-out portions abutting the parallel plates intermediate their ends, the cut-outs and lugs forming a chamber having parallel sides to receive the cartridge unit therein; and said sections having piloting lugs disposed 90° from the segmental lugs for maintaining the housing sections in concentric relation.

8. A differential for connecting aligned axle sections or the like, comprising a gear carrier; aligned axle sections entering said gear carrier; means for rotating said carrier; spaced parallel worm wheels within the carrier mounted on the respective axle sections; a removable cartridge unit within the carrier rotatable therewith, said unit comprising a pair of substantially parallel plates, pairs of worms having their ends journaled in the pairs of plates, said worms meshing with the respective worm wheels at diametrically opposite sides thereof, and meshing spur gears connecting the worms, whereby the load on the axle sections will be constantly equalized by the spur gears rotating in opposite directions, the helical angle of the worms preventing either axle section from spinning with respect to the other due to loss of traction; a housing enclosing the gear carrier; and said means for rotating the carrier comprising a shaft secured to the carrier and entering one end of the housing, a driven gear on said shaft; and said worm wheels being mounted on coaxial shafts entering the opposite end of the housing.

9. In a differential as set forth in claim 8, said gear carrier having diametrically opposed lugs receiving the side plates of the cartridge unit, said lugs forming a substantially rectangular chamber therefor; and a plate secured to the outer ends of the lugs for piloting the cartridge unit therein, said plate having segmental keys engaging the outer faces of the parallel plates.

VERNON E. GLEASMAN.

REFERENCES CITED

The following references are of record in the file of this patent:

UNITED STATES PATENTS

| Number | Name | Date |
| --- | --- | --- |
| 1,354,937 | Alcorn | Oct. 5, 1920 |
| 1,402,301 | Leipert | Jan. 3, 1922 |
| 1,404,791 | Nogrady | Jan. 31, 1922 |